United States Patent [19]

Sevelinge

[11] Patent Number: 4,802,806
[45] Date of Patent: Feb. 7, 1989

[54] TENSION DEVICE FOR TIGHTENING AND LOOSENING BOLTS OR PINS

[75] Inventor: Gerard Sevelinge, Montceau-les-Mines, France

[73] Assignee: Framatome, Courbevoie, France

[21] Appl. No.: 926,499

[22] Filed: Nov. 4, 1986

[30] Foreign Application Priority Data

Nov. 4, 1985 [FR] France ................ 85 16293

[51] Int. Cl.⁴ .................. F16B 35/02; F16B 37/08
[52] U.S. Cl. .................. 411/383; 411/434; 411/535
[58] Field of Search ............ 411/8–12, 411/14, 19, 383, 384, 434, 432, 427, 385, 535

[56] References Cited

U.S. PATENT DOCUMENTS 2,934,968  5/1960  Neumann et al. ............ 411/383

FOREIGN PATENT DOCUMENTS

| 101268 | 2/1984 | European Pat. Off. . | |
| 2052788 | 5/1972 | Fed. Rep. of Germany | 411/434 |
| 2341170 | 5/1974 | Fed. Rep. of Germany | 411/434 |
| 2152557 | 4/1973 | France . | |
| 2168632 | 8/1973 | France . | |
| 2274997 | 1/1976 | France . | |
| 2329414 | 5/1977 | France . | |

Primary Examiner—Neill Wilson
Attorney, Agent, or Firm—Pollock, Vande Sande, & Priddy

[57] ABSTRACT

Tension device for tightening and loosening bolts or pins, formed by a body having at least one jack (40) equipped with a piston (25). Each jack (40) is associated with at least two bolts or pins (3) placed next to one another for simultaneous tightening or loosening.

8 Claims, 5 Drawing Sheets

TENSION DEVICE FOR TIGHTENING AND LOOSENING BOLTS OR PINS

FIELD OF THE INVENTION

The present invention relates to a ten device which exerts a pull on bolts or pins so as to keep them in a prestressed state, to make it possible to tighten or loosen a nut in this position, for example for fastening the cover of a vessel.

BACKGROUND OF THE INVENTION

It is known that, for example in nuclear reactors, the cover is fastened to the vessel removably, to make it possible to recharge the reactor periodically with fuel and, by means of this cover, to inspect the interior of the vessel and the elements located inside it.

For this purpose, the cover is fastened to the reactor vessel by means of pins which are screwed into the collar of the vessel and which penetrate smooth holes provided in the collar of the cover. These pins are usually used in fairly large numbers and are relatively close to one another, with the result that all these pins have to be unscrewed and screwed in order to remove and refit the cover.

Furthermore, during the tightening and loosening operations, a pull is exerted on the pins by means of a tension device, to put them in a prestressed state.

For this purpose, FR-A-No. 2,329,414 makes known a tension device composed of an assembly of hydraulic tensioners fastened and distributed in polar symmetry on a supporting ring. The hydraulic tensioners act simultaneously and exert the desired prestress on each pin. To exert the desired force, each hydraulic tensioner has several superimposed stages, each comprising a piston provided with a central bore, through which the pin shank passes, and having a lower part forming a guide skirt and an upper part of larger diameter forming a piston. This arrangement is moreover necessitated by the reduced space between the pins. Each stage has a cell provided with a shoulder surrounding the said piston and its skirt. There are means of introducing a fluid at high pressure at the said shoulder, and the upper stage interacts with a traction device fastened to the end of the pin. The thickness of the skirts of the said pistons increases from the lower stage to the upper stage.

This device therefore has several superimposed stages for each tensioner, thus resulting in a multiplicity of gaskets, causing difficult and costly maintenance and increasing the risks of leaks. Furthermore, because the overall size of the device depends on its environment, the force necessary for obtaining the prestress is limited by the usual working-fluid pressures, and, if the force is to be increased, this can only be done by increasing the number of superimposed pistons.

On the other hand, FR-A-No. 2,274,997 makes known a device for screwing and unscrewing undertension for opening or closing the cover of a vessel of a nuclear reactor, with a supporting ring provided with lifting jacks which, under pressure, subject the vessel pins to tension. This device makes use of a pair of two single-stage jacks for each pin, thus increasing considerably the number of jacks on the supporting ring. Consequently, one of the difficulties with this device is the coordination of the simultaneous displacement of the pistons of all the jacks. Another disadvantage of such a device is that the power level remains limited because of its overall size.

SUMMARY OF THE INVENTION

The object of the invention is, therefore, to provide a tension device for bolts or pins, formed by a body having at least one jack, each equipped with a piston, the device making it possible to operate by means of a much lower pressure than that required to obtain an equivalent force with a double single-stage jack or a multi-stage jack.

According to the invention, each jack is associated with at least two bolts or pins placed next to one another for the simultaneous extension of the said bolts or pins.

BRIEF DESCRIPTION OF THE DRAWINGS

To make it easier to understand the invention, an embodiment of the device according to the invention will now be described with reference to the attached figures.

DESCRIPTION OF PREFERRED EMBODIMENTS

Figure 1:
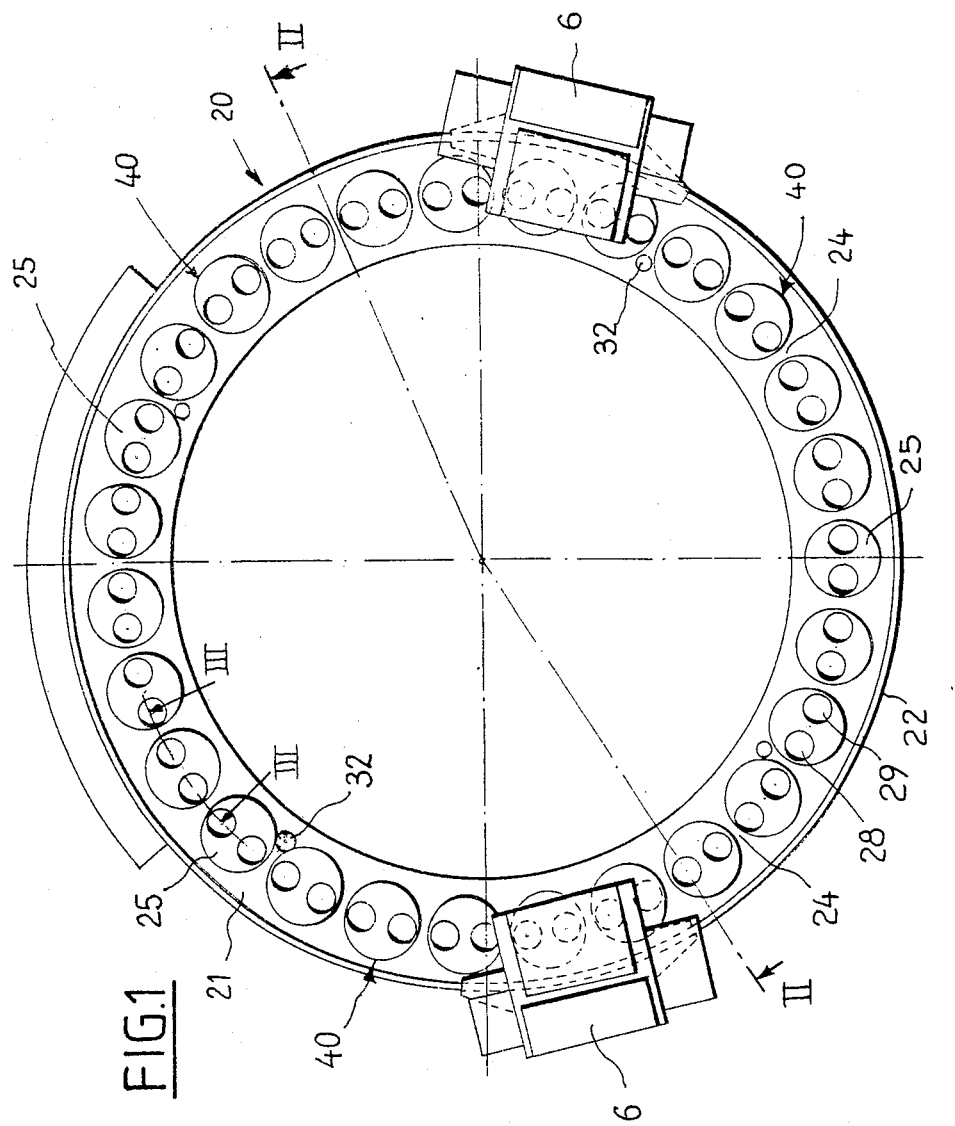
FIG. 1 is a diagrammatic plan view of a first embodiment of the tension device according to the invention.
Figure 2:
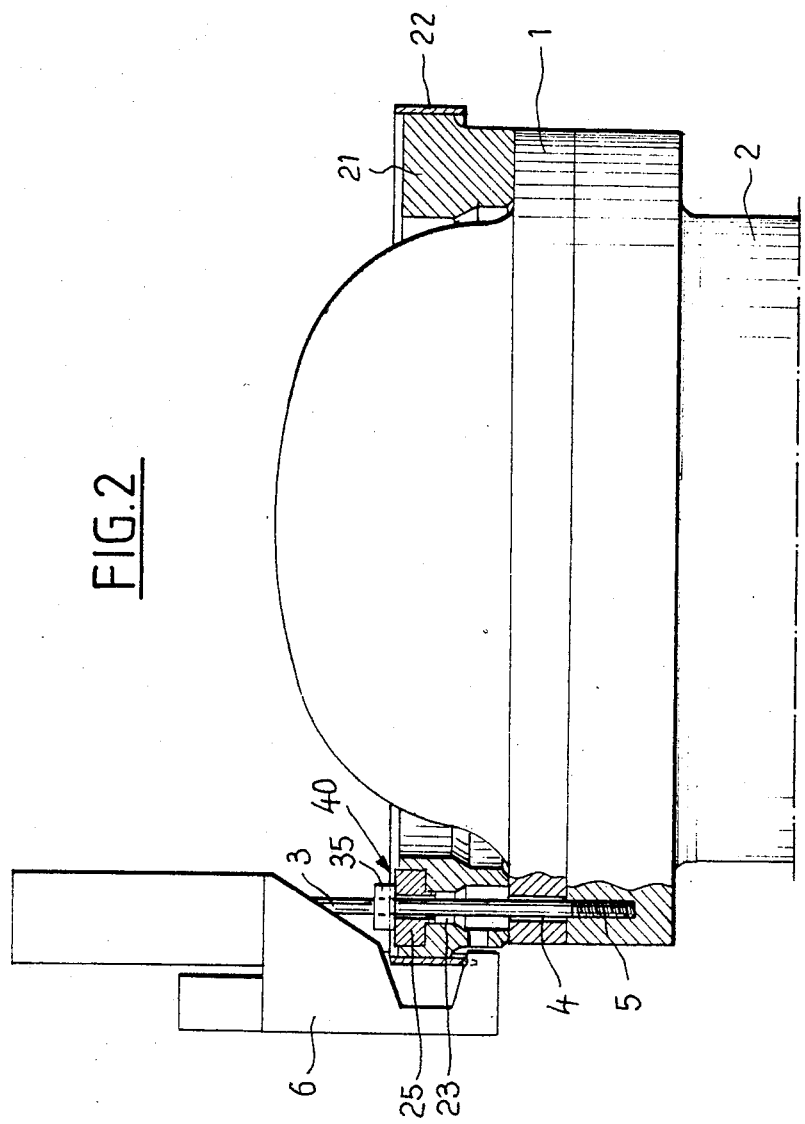
FIG. 2 is sectional view along the line II—II of FIG. 1.

The tension device according to the invention is used to exert a pull on pins so as to keep them in a prestressed state, to make it possible to tighten or loosen, in this position, nuts retaining the cover 1 of a vessel 2, for example that of a nuclear reactor (FIG. 2). As is well known, the cover 1 and the vessel 2 have a form of revolution about a vertical geometrical axis. The cover 1 is fastened removably to the vessel 2 by means of several pins 3., with the associated nuts, the vertical axes of which are uniformly distributed on the periphery of the cover 1 of the vessel 2.

Each pin passes through a smooth hole 4 provided vertically in the collar of the cover 1 and is provided, in its lower part, with a thread intended to be screwed into a tapped hole 5 in the collar of the vessel 2. The other end of the pin 3 projects outside the cover 1.

The first embodiment of the tension device will be described with reference to FIGS. 1 to 4.

The tension device comprises a body, designated as a whole by reference 20, consisting of a supporting ring 21 of rigid structure, having a form of revolution about a vertical geometrical axis corresponding to the form of revolution of the cover 1.

The solid supporting ring 21 has on its lateral peripheral face a running track 22 for positioning several screwing robots 6 which can thus move round the supporting ring 21 so as to position themselves above the pins 3.

Figure 3:
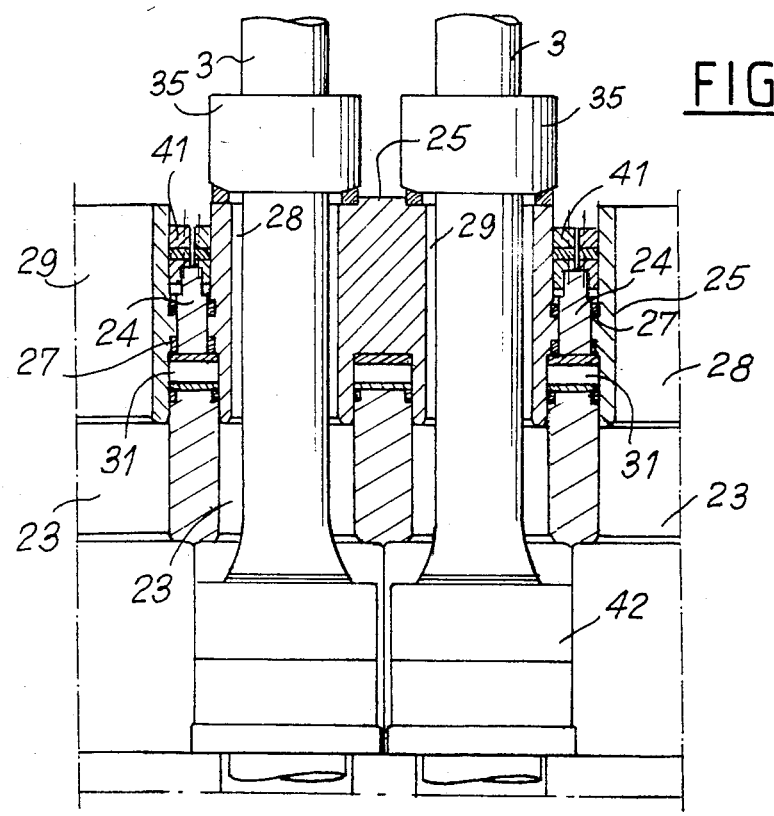
FIG. 3 is a sectional partial view along the arc of a circle III—III of FIG. 1.
Figure 4:
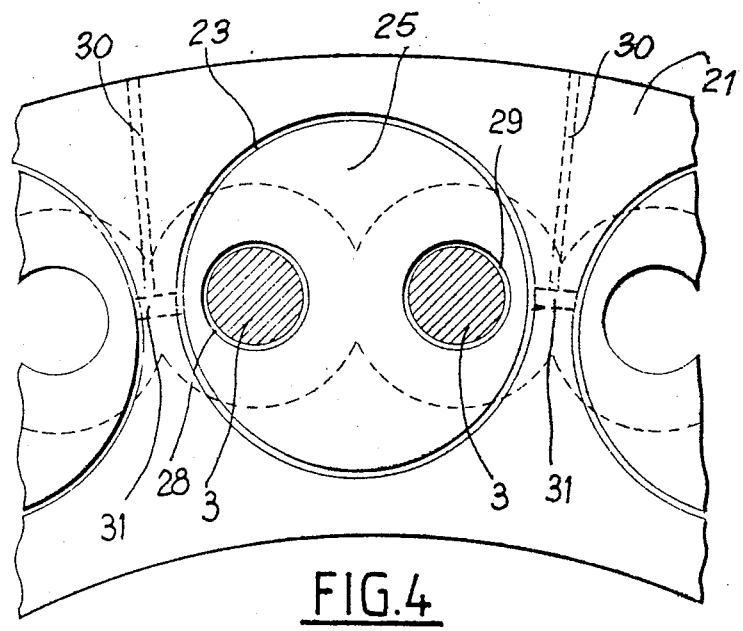
FIG. 4 is a sectional plan view along the line IV–IV of Fi 3.

This supporting ring 21 has a series of jacks 40 uniformly distributed in polar symmetry about the axis of revolution of the said ring. These jacks 40 each consist of a cavity 23 and of a piston 25 located inside the said cavity 23. The cavities 23, which have a considerable surface area, pass right through the supporting ring 21 and, in their lower part, have a larger diameter than in their upper part. Thus, the adjacent cavities 23 have between them, in the upper part, a connecting piece 24 of reduced thickness of the supporting ring and, in their lower part, intersect one another, as shown in FIG. 3.

Each piston 25 is perforated with two parallel vertical orifices 28 and 29, the diameter of which is greater than the diameter of the body of the pin 3, to allow an angular offset between two pins of the same pair. The distance between the centers of the orifices 28 and 29 of the various pistons 25 corresponds to the distance between the centers of the pins 3.

Sealing between each piston 25 and the supporting ring 21 is ensured by gaskets 27 and by a collar 41 formed from a stack of washers and gaskets and fastened round the piston 25 on the supporting ring 21 by means of screws or small pins (not shown).

The pistons 25 project above the upper face of the ring 21 and have a certain freedom of inclination relative to the said supporting ring. This inclination is made possible because of a slight difference between the outside diameter of the upper part of the pistons 25 and the inside diameter of the corresponding cavity 23, and also because of the configuration of the gaskets.

It will be seen that the supporting ring 21 and the pistons 25 form a series of uniformly distributed jacks 40, the cylinders of which are formed by the said supporting ring 21.

The pistons 25 can be supplied with working fluid either individually from the periphery of the supporting ring 21 or in series via small channels 30 and 31 provided in the said supporting ring 21.

Finally, hydraulic jacks 32 (FIG. 1), of which there are, for example, four and which make it possible to lift the device as a whole automatically are embedded in the thickness of the supporting ring 21.

The device thus described operates as follows:

First of all, the supporting ring 21 provided with the various pistons 25 is placed on the bearing surface of the collar of the cover 1, the ends of the pins being introduced into the orifices 28 and 29 of each piston 25. Subsequently, a gripping piece 35 formed, for example, by a nut, a set of jaws or another means is fastened to the shank of each pin 3 above the supporting ring 21. After these preliminary operations, the jacks 40 are supplied simultaneously with working fluid via the small channels 30 and 31. The piston 25 of each jack is lifted and at the same time exerts a pull on two pins 3 by means of the gripping pieces 35. Tensioning is simultaneous for all the pins 3.

The connection of each piston 25 to the gripping pieces 35 of each pair of pins is conventional, even if there is an angular offset between two pins of a pair or if a slight difference in height between the gripping pieces has occurred, this being due to the play existing between the pins and the piston and to the freedom of axial inclination of the said piston. The tensioning of the pins, carried out in this way, whether during fitting or removal, can be followed by the various operations of screwing or unscrewing the nuts 42 retaining the cover which are accommodated in the lower part of the cavities 23.

Figure 5:
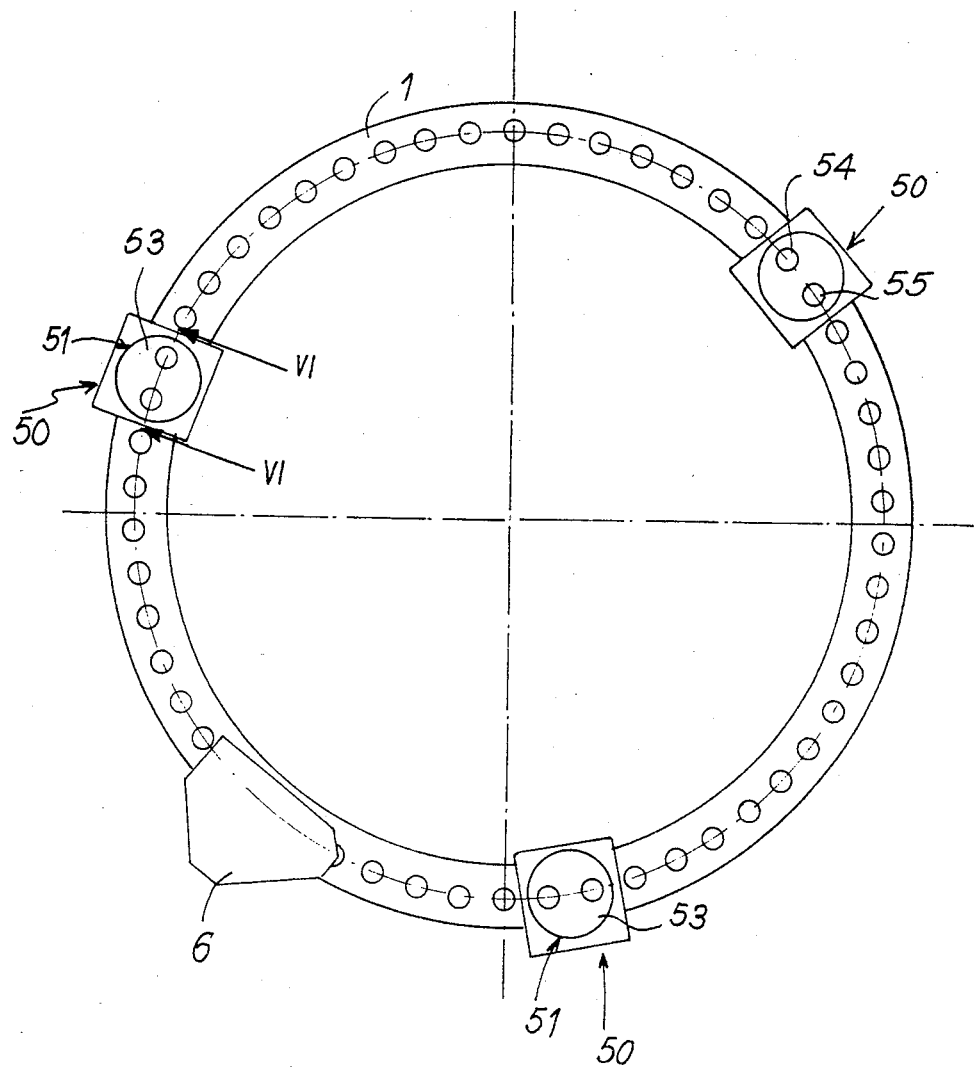
FIG. 5 is a diagrammatic plan view of a second embodiment of the tension device according to the invention.
Figure 6:
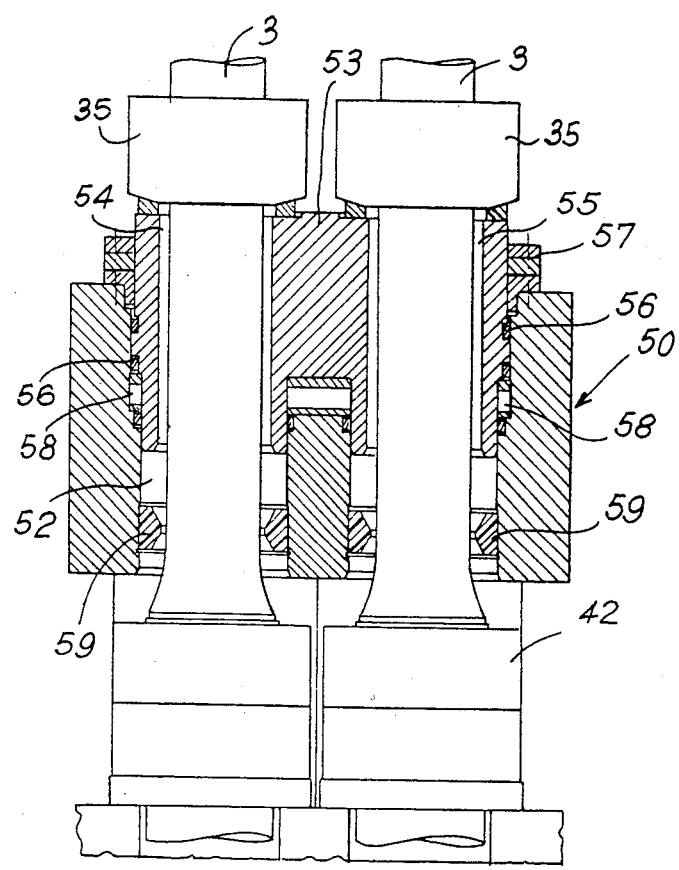
FIG. 6 is a sectional view along the arc of a circle VI—VI of FIG. 5.

In the second embodiment, illustrated in FIGS. 5 and 6, the tension device 20 consists of at least one module 50.

The module 50 comprises a jack 51 consisting of a cavity 52 made inside the body of the said module and of a piston 53 located inside the said cavity 52. The piston 53 is perforated with two vertical orifices 54 and 55, the diameter of which is greater than the diameter of the pin body 3, to allow an angular offset between two pins of the same pair. The distance between the centers of the orifices 54 and 55 corresponds to the distance between the centres of the pins 3.

Sealing between the piston 53 and the body of the module 50 is likewise ensured by gaskets 56 and by a collar 57 formed from a stack of washers and gaskets and fastened round the piston 53 on the body of the module by means of screws or small pins (not shown).

The piston 53 projects above the upper face of the body of the module and has a certain freedom of inclination relative to the said body. The piston 53 is supplied with working fluid via small channels 58.

Finally, plastic washers 59 are provided in the lower part of the cavaties 52 to center the module 50 on the pins 3 and thus prevent any risk of damage to the threads of the said pins.

In the example illustrated in FIG. 5, three uniformly distributed modules 50 are fitted to the bearing surface of the collar of the cover 1 by introducing the ends of the pins 3 into the orifices 54 and 55 in the piston 53 of each module.

The gripping piece 35 is fastened to the body of each pin 3, and the jack 51 of each module is supplied simultaneously via the small channels 58. The piston 53 of each module 50 rises and at the same time exerts a pull on two pins 3 by means of the gripping pieces 35.

The connection of the piston 53 of each module to the gripping pieces 35 of each pair of pins is conventional, even if there is an angular offset between two pins of a pair or if a slight difference in height between the gripping pieces has occurred, this being due to the play existing between the pins and the piston and to the freedom of axial inclination of the said piston.

After the three pairs of pins have been tensioned, whether during fitting or removal, the various operations of screwing or unscrewing the nuts 42 retaining the cover are carried out, and then the three modules 50 are shifted in order to tension three other pairs of pins.

Tensioning can also be carried out by means of a single module by positioning it on each pair of pins in succession in order to tension all the pins.

This tension device for tightening or loosening bolts or pins, which consists either of a rigid supporting ring or of modules, can be used at low pressure and at medium pressure, as required. Furthermore, the jacks have a very low stroke/diameter ratio.

Moreover, it should be noted that the jacks have a large surface area, thus making it possible to use a working-fluid pressure which does not require a high level of machining quality or narrow production tolerances.

Because each jack piston has such a diameter that its effective cross-section contains the overall bulk of two pins, it becomes possible to operate at much lower pressure than that required to obtain an equivalent force with a device of the type with a double single-stage jack or a multi-stage jack.

It can therefore be seen that the use of pistons of large diameters makes it possible, among other things, to employ a working fluid at a relatively low pressure and to reduce the number of jacks for the simultaneous tensioning of all the pins and, consequently, the number of gaskets, which are zones with a leakage risk. Finally, as indicated above, it makes it possible to take into account the offsets of the pins, whether they are inherent in or the result of operation.

The device according to the invent-ion can be used not only in nuclear power stations with a pressurized-water reactor, but in other sectors of the nuclear industry, in petroleum and petrochemical plants hydraulic valves, pressurized pipes or valve bodies. In general terms, the device according to the invention is used in many industrial installations which employ elements requiring prestress.

What is claimed is:

1. Tension device for simultaneous tightening and loosening of a plurality of fastening member (3), said device comprising a body having at least one jack (40, 51) equipped with a piston (25, 53), each said at least one jack (40-51) being associated with at least two fastening members (3) positioned adjacent to one another for simultaneous extension thereof.

2. Tension device according to claim 1, wherein said body consists of a rigid ring (21), the piston (25) of said at least one jack being positioned in a cavity (25) machined directly inside said ring (21), said ring constituting a cylinder of said at least one jack (40).

3. Tension device according to claim 1, wherein said body consists of independent modules (5), the piston (53) being positioned in a cavity (52) machined directly inside a said module, said module constituting a cylinder of said least one jack.

4. Tension device according to claim 2 or 3, wherein the diameter of an upper part of each said piston (25-53) is slightly less than the diameter of an upper part of a corresponding cavity (23, 52), to permit slight inclination of said piston in its cavity.

5. Tension device according to claim 2 or 3, wherein each piston (25, 53) has at least two parallel vertical orifices (28, 29; 54, 55), enabling the bodies of said fastening members (3) positioned adjacent to one another to pass through each of said pistons.

6. Tension device according to claim 5, wherein said orifices (28, 29; 54, 55) have a diameter greater than the diameter of the bodies of said fastening members.

7. Tension device according to claim 6, wherein the distance between centers of said orifices of each jack (40, 51) corresponds to the distance between centers of said fastening members.

8. Tension device according to claim 2, wherein said ring (21) has, on its lateral peripheral face, a running track (22) for the positioning and guidance of screwing robots (6).

* * * * *